United States Patent Office 3,133,829
Patented May 19, 1964

3,133,829
METHOD OF APPLYING PROTECTIVE COATINGS TO METALS
Martin E. Cupery, Raymond P. Jackson, and Walter H. Wright, Wilmington, Del., assignors to E. I. du Pont de Nemours and Company, Wilmington, Del., a corporation of Delaware
No Drawing. Filed Feb. 2, 1959, Ser. No. 790,354
6 Claims. (Cl. 117—127)

This invention relates to the discovery that metals can be protected against attack by surrounding atmospheres by coating the metals with colloidal silica. More particularly, the invention is directed to processes for protecting metals, especially ferrous metals, and thereby minimizing undesirable changes in the surface regions at elevated temperatures, said processes comprising covering the metal to be protected with a film of colloidal silica sol in which the ultimate silica particles have an average size of about 3 to 150 millimicrons and the alkalinity is not more than enough to make the $SiO_2$:alkali oxide weight ratio at least 60:1, drying the sol, and heating the dried coating to at least 500° F. The invention is further directed to such processes in which a coated, carbon-containing ferrous metal article which has been heated to at least 1200° F. is quenched to remove the coating, leaving the substrate metal substantially free of surface oxide, and to the quenched article so produced. The invention is still further directed to articles comprising a substrate of a metal susceptible to atmospheric attack at elevated temperatures having thereon an adherent coating of silica which has been heated to at least 500° F., the thickness of the coating being not greater than 5 microns and the coating being sufficiently free of alkali that the weight ratio of silica to alkali, calculated as $Na_2O$, is at least 60:1.

The undesirable changes which occur in metals, especially in the surface regions, during exposure to elevated temperatures are a primary restriction upon their service suitabilities and upon methods used for fabricating them. Oxidation of metals, loss of alloying agents, decarburization, carburization, scale formation, internal oxidation, and the like are changes which have far-reaching effects on the product properties. Means for minimizing these changes or even avoiding them althogether would result in great economies in the making, shaping, treating and use of metals, especially ferrous metals.

The elevated temperatures at which metals are protected according to processes of this invention are those, for examples, commonly encountered in metal fabrication and are usually above about 500° F. Metals treated with colloidal silica can be conventionally fabricated; in fact, such treatment often eliminates the need for special fabricating procedures.

Metals To Be Treated

The metals which are susceptible to changes at elevated temperatures, particularly upon exposure to the surrounding atmosphere, are treated according to processes of the invention. Copper, or copper-containing alloys, for example, are suitable for treatment. Ferrous metals, especially steels, stainless steels, and iron-carbon alloys, are most benefited.

The metal to which the coating is applied can have any desired physical shape, although the greatest effects are obtained with metals having a maximum of surface area. Thus, sheet metal, and even metal foil, having relatively high surface area per unit of weight, present a maximum of surface area and are most advantageously treated.

Desirably, the surface of the metal to be coated is first cleaned to remove oil or grease, loose scale, and the like. The smoother the metal to be coated, the more effective is the coating operation. It is often preferred to pickle the metal or otherwise clean the surface by conventional procedures in preparation for the silica coating.

The Colloidal Silica Sol

Any colloidal silica can be used for coating the metal if it is capable of dispersing into particles having average diameters of about 3 to 150 millimicrons, preferably 7 to 30 millimicrons. The particles can be either silica or silica which has been surface-modified by other materials, chemically bound or adsorbed. The particles can be discrete as applied, and gelled or agglomerated after drying and heating.

The colloidal silicas as applied are dispersed in a liquid carrier in the form of a colloidal dispersion. Thus, silica particles which are dispersible in either organic and inorganic liquids can be used. For example, fumed silicas like "Cab-O-Sil," a submicroscopic, particulate silica, prepared in a hot gaseous environment by the vapor-phase hydrolysis of a silicon compound, can be used by dispersing them in a liquid carrier.

The silica dispersions can be organosols, the continuous phase being an organic liquid. Typical of such organosols are those prepared using 2-ethoxyethanol as the continuous, liquid phase. These organosols are prepared by reacting a silica aquasol of the type disclosed in Bechtold et al. U.S. Patent 2,574,902 with 2-ethoxyethanol and subsequently removing the water, as more fully described in U.S. patent application Serial No. 581,843, filed May 1, 1956, by Ralph K. Iler, now Patent No. 2,974,105.

Unmodified colloidal silica particles can be readily dispersed in aqueous media. To promote dispersion of silica particles in organic media, the particles can advantageously be treated with other materials. Thus, the particles can be surface esterified or have chemicals adsorbed upon their surfaces.

When surface-esterified, discrete silica particles are used, the particles are dispersed in organic liquid media as organosols. The surface-esterified particles will range in size from 3 to 150 millimicrons in diameter. The surfaces of the particles are coated with monohydric alcohol radicals containing up to about 18 carbon atoms per radical. In each radical, the carbon atom attached to the alcohol oxygen is also attached to at least one hydrogen.

Instead of being surface esterified, the silica particles can have adsorbed upon their surfaces a long-chain, substituted quaternary ammonium ion. The preparation of such silica particles is more particularly described in Iler U.S. Patent No. 2,692,863. Such colloidal particles form true organosols and their average size ranges from about 5 to 150 millimicrons in diameter. See also Iler U.S. Patent No. 2,786,042.

The more preferred silica particles are those which form true aquasols or organosols in water, or in organic or emulsified fluids. The most preferred silicas are those which form stable aquasols when colloidally dispersed in an aqueous carrier. By "stable" is meant that the sols are stable against gelation or settling for periods of time in excess of one year. The preferred types of sols can be prepared according to the methods described in Bechtold and Snyder Patent No. 2,574,902, Rule U.S. Patent No. 2,577,485 and Alexander U.S. Patent No. 2,750,345.

Sols produced in accordance with Rule U.S. Patent No. 2,577,485 and Alexander Patent No. 2,750,345 and Bechtold and Snyder U.S. Patent No. 2,574,902 are characterized by being alkali stabilized. The preferred class of sols have an $SiO_2$:$Na_2O$ weight ratio of about from 60:1 to 400:1. Specifically, sols of the Bechtold and Snyder patent having an $SiO_2$:$Na_2O$ weight ratio of about 90:1, containing substantially discrete particles of the amorphous silica about 17 millimicrons in diameter, and having a relative viscosity in the range of from about 1.15 to 1.55 as measured at 10% $SiO_2$ and pH 10, are particularly effective.

Sols prepared by processes of Rule Patent No. 2,577,485 ordinarily have a high mol ratio of $SiO_2$:$Na_2O$, ranging upwardly from 130:1 to 500:1. These sols are particularly advantageous where the presence of any large amount of alkali is undesirable.

Sols prepared in accordance with Alexander U.S. Patent No. 2,750,345 contain discrete particles which range from about 5 to 8 millimicrons in diameter.

Sols of the Bird U.S. Patent No. 2,244,325 and Voorhees U.S. Patent No. 2,457,971 can be used if a relatively dilute sol is suitable for preparing a particular coating.

Other useable sols include those which can be made by dispersing in water finely divided silica such as that prepared by burning hydrogen with air saturated with silicon tetrachloride. Such sols are disclosed in Reik U.S. Patent No. 2,428,178 and Broughton U.S. Patent No. 2,535,036.

Still other silica sols which can be employed in the processes of the invention are those shown in White U.S. Patent No. 2,282,477; Marshall U.S. Patent No. 2,356,774; White U.S. Patent No. 2,375,738; Trail U.S. Patent No. 2,572,578; Trail U.S. Patent No. 2,573,743; and Legal Jr. U.S. Patent No. 2,724,701.

The concentration of silica present in the silica sol employed as coating material according to the invention can be varied widely. Thus, from a fraction of a percent up to the maximum silica content which can be obtained in a sol stable for the duration of the coating procedure can be advantageously used. The numerous silica sols above described are shown in various concentrations and these concentrations can be used in amounts ranging from a fraction of a percent up to 45 or even 60 percent or more of $SiO_2$. The most preferred range is about from 3 to 8%.

*Applying the Silica to the Metal Surface*

In the processes of the invention, colloidal silica is applied to the surface of a metal in such a manner that a uniform, thin, adherent coating of dry silica on the metal is obtained. This objective is achieved by covering the metal with a film of a colloidal silica sol selected as above described, drying the sol, and heating the dried coating to at least 500° F.

Various methods are known in the coating art for applying liquid films to solid surfaces, and any such method can be used for applying the silica sol film to the metal. The metal can be either hot or cold, but preferably not hotter than about 400° F. Thus, for instance, the silica sol can be painted, sprayed or poured over metal, or it can serve as a dip-bath. Good coating action can be obtained by any of these methods.

Small amounts, say less than 1% by weight, of wetting and surface-active agents can be added to the silica sol to aid in getting complete coverage of the metal. Typical of such agents are the dioctyl ester of sodium sulfosuccinate (sold under the Du Pont trademark "Alkanol DW"), sodium sulfate derivative of 3,9-diethyltridecanol-6 (sold uinder the Carbide and Carbon trademark "Tergitol 7"), or polyoxyethylene sorbitan monolaurate (sold under the Atlas Powder Company trademark "Tween 20").

One particular method of applying the colloidal silica is to dilute a commercially available, alkali-stabilized aquasol containing about 30 weight percent silica, for example, "Ludox" (a Du Pont trademark) to a concentration of 5 weight percent. Then, metal articles to be coated are dipped into the solution. After dipping and air drying, the article can be dried in an oven for a short time, say at about 100° C. for about ten minutes.

An alternative treatment is to brush the diluted sol onto the metal and then dry the sol film in air. The diluted sol can also be sprayed onto the metal surfaces.

Another method of applying such a diluted sol is to spray it upon a hot metal surface and then roll the metal. This method is especially useful in the production of sheet, strip and plate, although it can be used anywhere in processes for the fabrication of metals where hot rolling is involved. It is particularly preferred in the case of mild steel.

In general, the particular method of application used will be determined by the circumstances of the particular use situation.

*Heating the Silica-Coated Metal to Elevated Temperatures*

Coating of metal surfaces with colloidal silica minimizes or eliminates the need for special protective measures during that period when the metal is exposed to elevated temperatures. Probably the most common situation where colloidal silica coatings can be used in fabricating metals is in the hot working and heat treatment of ferrous metals.

Undesirable changes in the surface regions of metals often occur at the necessary elevated temperatures commonly employed during metal fabrication processes. These changes result in losses of metal and alloying agents, and contamination of the metal (carburizing). By coating the surfaces of metals undergoing fabrication with colloidal silica, before the metals are exposed to the customary elevated temperature conditions employed, losses of metal and alloying agents, and contamination, are minimized. Colloidal silica coatings are advantageously applied even though the shape or form of the metal is altered, as by hot rolling or the like, during fabrication. The temperatures at which such deleterious material losses occur in metals often begin at about 500° F.

The heating of the metal having the dried film of silica sol on its surface in a process of this invention can, then, be incidental to or coincidental with fabrication of the metal at elevated temperatures. But fabrication, or working, of the metal at this step of the process is not essential. Rather, the heating can be carried out as a separate, independent step. Thus, the metal bearing the dried-down film of silica sol can be heated in a furnace, by radiation, by induction, or by any of the other conventional means for heating metals.

Whatever the heating means employed, the metal is heated to at least 500° F. This heating is sufficient to develop in the coating a substantial resistance to removal by simple abrasion, and to impart to the coated metal some degree of protection against atmospheric attack at elevated temperatures, at least on a temporary basis. The latter property is particularly valuable when the metal is mild steel.

When the silica coating is to be only temporary, a valuable descaling effect can be obtained with mild steel by heating to at least 1200° F. and then quenching, as in a liquid quenching medium known to the art. For instance, the hot, coated metal can be plunged into water or a quenching oil. This effects a descaling action, leaving the metal with a bright surface suitable for enameling, galvanizing or similar permanent surface finishes.

The heating to 1200° F. appears to cause some incipient sintering or surface fusion; hence, heating to at least 1200° F. is preferred for coatings which are to be characterized by reduced porosity.

When maximum imperviousness of the silica coating on austenitic stainless steels is desired it is especially preferred to heat to at least 1900° F. After such heating the base metal is found to be covered with a permanent, adherent, protective silica coating, and the metal is remarkably resistant to attack by the atmosphere at elevated temperatures, and even by such strongly corrosive materials as ferric chloride solution.

The maximum temperature of heating depends on the metal in each case, but in no event is higher than the melting point of the metal.

The Coated Metal Articles

The coated metal articles, comprising a substrate of a metal normally susceptible to atmospheric attack at elevated temperatures having thereon an adherent coating of silica which has been heated to at least 500° F., the thickness of the coating being not greater than about 5 microns and the coating being sufficiently free of alkali that the weight ratio of silica to alkali, calculated as $Na_2O$, is at least 60:1, are a further aspect of this invention.

By "adherent" is meant that a strip of mild steel bearing the silica coating can be bent to an arc of 0.5 inch radius without cracking off the coating.

The thickness of the silica coating can be calculated by weighing the silica deposited on a metal strip of known area. From the density of amorphous silica, weight pickup, and area, the thickness can be calculated.

The silica:alkali ratio of the coating will, of course, be determined by the composition of the sol originally used for laying down the coating, except when such sol is stabilized with a volatile base such as ammonia. The ratio can easily be determined by conventional methods of analysis.

The Utility of the Processes and Products

The colloidal silica coatings are particularly advantageous upon ferrous metals. The three problems probably most often encountered with ferrous metals during fabrication are scale formation, carburization, and decarburization. It is preferred to coat ferrous metals with colloidal silica before exposing them to temperatures in excess of about 800° F. However, colloidal silica coatings can advantageously be present on ferrous metals even during exposure to such elevated temperatures, as 500 to 800° F.

The methods of the invention are very useful for retarding scale formation and accompanying loss of metal and alloying elements and agents, especially in ferrous metals, at elevated temperatures. When iron without the coating is heated in air or in oxidizing atmospheres at temperatures above, say, about 1000° F. (550° C.), an outside layer of $Fe_2O_3$, an intermediate layer of $Fe_3O_4$ and an inner layer of $FeO$ appear in succession on the iron base; the surface of the iron itself is also saturated with the quantity of oxygen soluble in the iron at the exposure temperature. The silica coating retards this action of oxygen on the iron.

Similarly, reaction of hot air on iron-carbon alloys without the coating causes not only the formation of external scales, but oxygen can also diffuse into the metal base, resulting in "internal oxidation," usually metallographically visible as a layer that contains particles of the oxide embedded in the solvent metal. Scales generally consist of a layer-like structure, each layer comprising an oxide phase that is stable at the reaction temperature. Thus, scaling of iron and iron-carbon alloys occurs by a process of diffusion of oxygen inward and of metal outward through the scale layer already formed. In ordinary carbon steels the amount of scaling in air is negligible below about 1000° F. Above this temperature the rate of scaling increases rapidly.

When by the processes of this invention such metal subject to scaling at temperatures above about 1000° F. is coated with colloidal silica prior to heat exposure a considerable reduction in scaling results, without interfering with the fabrication processes used on the metal. Ferrous metal so coated can, for example, be hot rolled, annealed, or the like to produce products having minimum scale. Often the need for using special alloys, or for using special procedures to reduce scaling and accompanying metal loss, is eliminated when metals are coated with silica before being exposed to scale-forming temperatures. It will be understood, of course, that in the case of mild steel, as noted above, scaling is not actually prevented, though minimized, and such scale as is formed is readily removed by quenching.

Another situation where the thin coatings of the invention have utility is in retarding the decarburization of ferrous metals at elevated temperatures. Decarburization consists of the loss of carbon from the surface of a ferrous metal as a result of heating in a medium that reacts with the carbon. Such carbon loss can be caused at elevated temperatures by reaction of carbon with oxygen or with hydrogen or with compounds containing either or both of these elements.

Decarburization results in a soft metal surface and may seriously affect the useful service life of metals or metal parts; it is usually particularly harmful in tool steels. Thus, when metal-carbon alloys have been heated to a temperature above 1000° F., (550° C.), in air, there is a serious loss of carbon from the surface regions of the metal.

Sometimes the scaling of metal is deliberately practiced to reduce the depth of the decarburized surface layer. For example, in some types of controlled annealing, oxygen of the air may be caused to scale the steel as fast as it decarburizes it, with the result that the depth of the decarburized layer is reduced. However, scaling is undesirable since it represents a loss of metal, mars the surface finish, and may prevent rapid extraction of heat in a quenching operation.

By coating the surfaces of ferrous metals with a thin coating of colloidal silica prior to exposure to scaling temperatures, the decarburization of the metals at temperatures above about 1000° F. is substantially reduced. Ferrous metals so coated can, for example, be conventionally heated and, if desired, quenched to produce products having minimum decarburization. Often the need for using special processing procedures to reduce decarburization is eliminated when metals are coated with colloidal silica before heat treatment.

Carburization of stainless steels in reducing atmospheres or even in the carbon dioxide normally found in the steel mill atmosphere is a problem. Carbon in stainless steels lowers their corrosion resistance. Coating such steels with silica minimizes carburization in reducing atmospheres and thus can sometimes eliminate the need for maintenance of special atmospheres in the annealing furnaces.

Colloidal silica coatings are also used advantageously upon non-ferrous metals such as copper, aluminum, magnesium, zinc, tin, lead and the like. Alloys of these metals are also advantageously coated with colloidal silica particles. Because non-ferrous metals and their alloys tend to be soft, they are often cold worked, rather than hot worked, during fabrication. But whenever such metals are fabricated at temperatures of above about 500° F. colloidal silica coatings are advantageously employed to reduce changes in their surface characteristics. The oxidation characteristics of copper and other metals and their alloys is discussed by the following investigators: N. B. Pilling and R. E. Bedworth in Journal of the Institute of Metals, vol. 29, page 525 (1923); W. H. J. Vernon, Journal of the Chemical Society, vol. 130, page 2273 (1926); J. S. Dunn, Journal of the Institute of Metals, vol. 46, page 25 (1931).

In alloys, the problem of undesirable changes in the surface regions of metals during fabrication at elevated temperatures is particularly acute. Under such conditions there is a tendency for alloying metals and agents to preferentially oxidize with the result that surface regions of fabricated alloys can be entirely different materials from the underlying portions. Colloidal silica coatings on alloys being fabricated at elevated temperatures thus have outstanding merit.

Colloidal silica coatings are also advantageously employed during the hot rolling of metals, especially ferrous metals, where temperatures in excess of about 500° F. are commonly employed. Here, colloidal silica coatings are valuable not only because of their desirable effect of minimizing surface changes, but also because of their other effects. For one thing, even though the shape of the metal is altered and the surface area is usually very greatly increased, the anti-corrosive, anti-oxidative action of the colloidal silica particles is always apparent as shown by the appearance of the finished hot-rolled products.

Another advantage of colloidal silica coatings in the hot working of metals is the fact that such coatings have a tendency to permit the roll to take a larger nip or bite on, for example, hot steel billets being rolled. A larger bite means that a greater percentage reduction in billet thickness can be achieved in a single pass, with obvious consequent resultant economies in operation. A further advantage of using colloidal silica coatings in hot rolling is that hot-rolled metals, especially ferrous metals, exhibit temporary corrosion resistance after coating with colloidal silica.

Colloidal silica coatings can be readily applied in hot-rolling processes. For example, hot steel billets are commonly sprayed with water as a preliminary step in some hot-rolling operations. The colloidal silica coatings can be applied by simply adding commercially available silica aquasols to the water that is to be sprayed upon the hot billets.

In addition to the above examples, the invention is further illustrated by the following examples:

*Example 1*

A strip of S.A.E. 1018 steel measuring 6" x 1½" x ¼" is sand blasted and then sprayed with a colloidal silica aquasol containing 30% silica, a product commercially sold under the Du Pont trademark "Ludox" LS. The sol film is air dried and the steel is then heated to 2350° F.

A white, adherent coating of silica is obtained. Subsequently, the strip of treated metal is hot rolled such that its thickness is reduced from 0.25 inch to 0.20 inch. During the hot-rolling process practically no mill scale is produced.

After rolling and cooling, the strip is placed in water for a short period and it is observed that no rusting occurs. This is also the case when the strip is placed in 5% brine.

*Example 2*

A strip of S.A.E. 1018 steel measuring 6" x 1½" x ¼" is sand blasted and then sprayed with a colloidal silica aquasol containing 30% silica using a product sold under the Du Pont trademark "Ludox" HS. The treated strip is air dried and then heated for ten minutes at 600° F.

Subsequently, the strip is heated to 2350° F. in a non-protective atmosphere and then is hot rolled such that its thickness is reduced from 0.25 inch to 0.20 inch. When the treated strip is compared with an uncoated control which had undergone the same treatment, it is observed that the treated material exhibited less mill scale than the control.

*Example 3*

A rod of S.A.E. 4340 steel is heated to 190° F. in a protective atmosphere and immediately sprayed with an aquasol containing 5% colloidal silica. The film of silica is air dried, then heated to 700° F.

The aquasol is prepared by diluting a commercially available silica aquasol sold under the Du Pont trademark "Ludox" HS down to the desired silica content of 5% by weight.

The metal is cooled and stored; observation after ten days discloses that atmospheric corrosion is reduced.

Thus, Examples 1, 2 and 3 show that the methods of this invention retard the formation of mill scale during hot working thereby reducing metal loss and minimizing the problem of scale removal. The silica coating also offers temporary corrosion resistance during subsequent storage of the metal after fabrication and heat treatment. In addition, this coating is suitable for surface finishing such as painting, dyeing, and coating with resins in ways well known and understood in the art.

*Example 4*

A rod of S.A.E. 1080 steel 3 inches long and ½ inch in diameter is dipped into a silica aquasol containing 5% colloidal silica. This silica sol contains particles having an average diameter of 17 millimicrons. Afterwards the metal is allowed to air dry and then is baked at 750° F. for ten minutes in a muffle furnace.

Next the rod is packed in spent coke and heated for one hour at 1850° F. after which it is quenched in water. The sample is then cut in two and a cross section polished and etched. Photomicrographs are taken using a magnification of 100.

The treatment is then repeated with an uncoated sample of the same steel and photomicrographs are similarly prepared.

A comparison of the two samples demonstrates clearly that decarburization is much less in the treated sample than in the untreated one.

*Example 5*

A rod of S.A.E. 1080 steel measuring 3 inches long and ½ inch in diameter is coated with silica using the same procedure and materials as described in Example 4 except that the sol is sprayed on the metal instead of dipping the metal. This coated article is next heated in air at 1800° F. for one hour and is then quenched in water. A sample of the steel is cut, polished and etched.

This same procedure is repeated using a like though untreated rod of the same steel and the results compared. It is observed that decarburization is greatly retarded in the coated sample.

*Example 6*

A rod of S.A.E. 1040 steel 3 inches long and ½ inch in diameter is coated with silica according to the procedure described in Example 4.

The treated rod is then packed in spent coke and heated for one hour at 1805° F. The rod is then quenched in water. The sample rod is then cut in two and a cross section polished and etched. Photomicrographs are taken using a magnification of 100. This treatment is then repeated using untreated sample of the same steel and the results compared.

It is observed that the treated sample is decarburized to a much lesser extent than the untreated sample.

*Example 7*

A rod of copper (1 inch diameter, 3 inches long) is heated to 180° F. and sprayed while hot with an aqueous dispersion of 3% by weight colloidal silica having particles of average diameters ranging from about 17 to 20 millimicrons. Dissolved in the water is 0.3% by weight of dioctyl ester of sodium sulfosuccinate. The air-dried silica coating is then baked at 850° F.

The coated rod is hot rolled at the same temperature.

When compared with an untreated control, it is observed that scaling on the coated copper is less than on the uncoated copper control.

*Example 8*

A plate of cartridge brass 4" x 2" x ½" is dipped into a solution containing 3% by weight of colloidal silica having average particle diameters of about 50 millimicrons and containing about 0.20% by weight of alkyl aryl sodium sulfonate (sold under the Du Pont trademark "Alkanol" DW).

The plate is then air dried and baked at 500° F. for ten minutes.

The cartridge brass plate is then heated in the temperature range of about 1350 to 1500° F. and subsequently hot rolled to a thickness of .25 inch.

When the coated specimen is compared to an identical uncoated metal specimen hot rolled in the same manner, it is found that the surface of the coated material is not oxidized as much as the uncoated material.

Example 9

A rod of 4340 steel is heated to 190° F., sprayed with an aqueous dispersion containing 5 weight percent of colloidal silica particles having average diameters of 30 millimicrons, air dried, and heated to 2000° F. in a protective atmosphere.

The rod is then hot rolled and little oxide scale is observed. Furthermore, after the hot-rolled steel is cooled and stored for ten days in air, corrosion due to atmospheric attack is seen to be reduced compared to an untreated control rod.

A like rod is heated in the same manner and sprayed with a similar dispersion of silica, except that the average diameter of the silica particles is 100 millimicrons. Comparable results are obtained.

Example 10

A specimen of 316 stainless steel (4" x 6" x 1/16") was coated on one half of its surface with "Ludox" colloidal silica sol at 5% $SiO_2$, air dried, and then heat treated for one-half hour at 1900° F. and air cooled. When the specimen was immersed in a conventional 6% hydrochloric acid pickling solution, it was observed that the coated part of the specimen pickled faster than the non-coated surface and that after pickling the area that had been coated was brighter than the non-coated area. Also the surface without the "Ludox" coating had some scale pattern after being pickled, whereas the coated surface did not have any scale pattern.

Example 11

A specimen of mild steel (4" x 6" x 1/16") was coated on one half of its surface with "Ludox" colloidal silica sol at 5% $SiO_2$, air dried, and then heat treated at 1600° F. for five minutes and quenched in oil. During the heat treatment a scale formed over the entire specimen; however, it was observed that there was less scale on the coated areas. This scale on the coated area was loose and could be washed off with water leaving a bright surface, whereas the scale on the uncoated side could not be removed by washing with water. This "Ludox" coating, applied prior to heat treatment, had effectively facilitated the scale removal first, by causing less scale to be formed and second, by causing the scale that did form on the coated areas to be loosely adherent.

This application is a continuation in part of our co-pending United States application Serial No. 738,931, filed June 2, 1958, now abandoned.

We claim:

1. In a process for minimizing undesirable changes in the surface regions of metals at elevated temperatures the steps comprising coating the metal to be protected with a film of colloidal silica sol in which the ultimate silica particles have an average size of about 3 to 150 millimicrons and the alkalinity is not more than enough to make the $SiO_2$:alkali oxide weight ratio at least 60:1, drying the sol, and heating the metal containing the dried coating to at least 500° F.

2. A process of claim 1 in which the size of the ultimate silica particles in the silica sol is in the range of about 7 to 30 millimicrons.

3. A process of claim 1 in which the metal to be protected is mild steel and is heated to an elevated temperature, not exceeding about 400° F., and maintained at that temperature while the film of silica sol is applied.

4. A process of claim 1 in which the concentration of silica in the silica sol used for coating the metal is about from 3 to 8% $SiO_2$ by weight.

5. A process of claim 1 wherein the thickness of the dried silica coating, after heating to at least 500° F., is up to 5 microns.

6. In a process for minimizing undesirable changes in the surface regions of stainless steels at elevated temperatures the steps comprising coating the stainless steel with a film of colloidal silica sol in which the ultimate silica particles have an average size of about 3 to 150 millimicrons and the alkalinity is not more than enough to make the $SiO_2$:alkali oxide weight ratio at least 60:1, drying the sol, and heating the stainless steel containing the dried coating to at least 1900° F., whereby an adherent, protective coating is formed on the stainless steel.

References Cited in the file of this patent

UNITED STATES PATENTS

| | | |
|---|---|---|
| 1,956,462 | Knuth | Apr. 24, 1934 |
| 2,707,324 | Walther | May 3, 1955 |
| 2,725,617 | Sternberg | Dec. 6, 1955 |
| 2,803,566 | Smith-Johannsen | Aug. 20, 1957 |
| 2,855,328 | Long | Oct. 7, 1958 |
| 2,888,742 | Stumbock | June 2, 1959 |
| 2,978,361 | Seidl | Apr. 4, 1961 |
| 3,013,898 | Dempcy | Dec. 19, 1961 |

FOREIGN PATENTS

| | | |
|---|---|---|
| 599,449 | Great Britain | Mar. 12, 1948 |

OTHER REFERENCES

The Making, Shaping and Treating of Steel, U.S. Steel Corporation, 7th Edition, 1957, page 587.